Sept. 24, 1946.     C. M. EASON     2,408,301
CLUTCH
Filed Jan. 22, 1943     5 Sheets-Sheet 3

INVENTOR.
Clarence M Eason,

Sept. 24, 1946.  C. M. EASON  2,408,301
CLUTCH
Filed Jan. 22, 1943   5 Sheets-Sheet 4
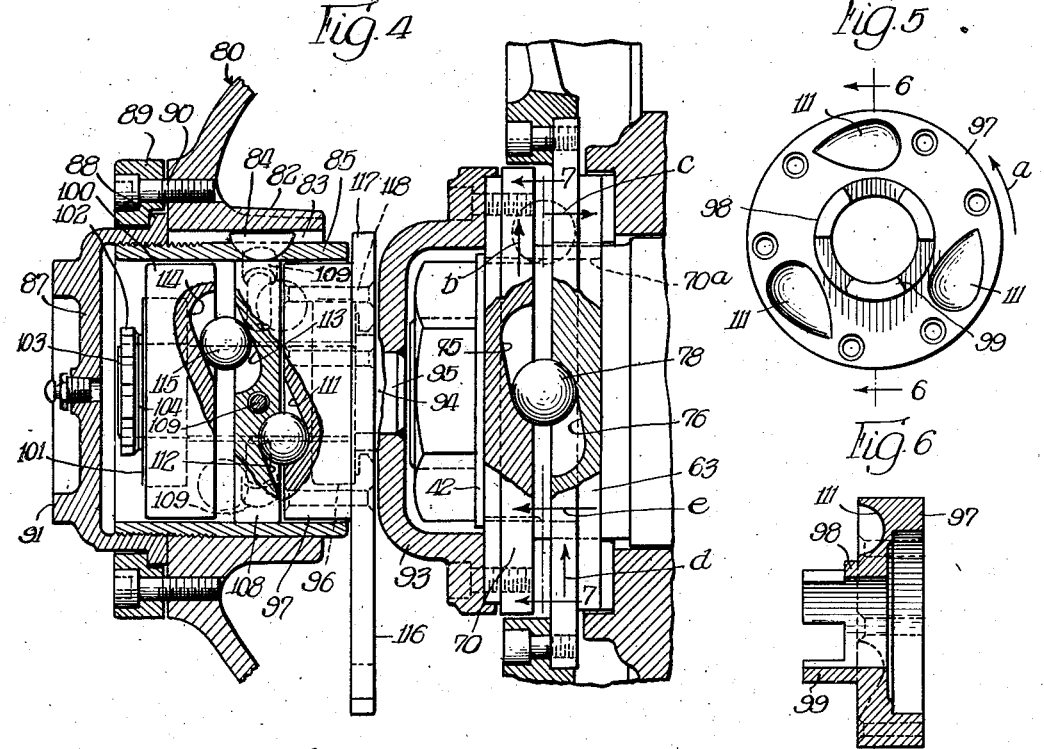
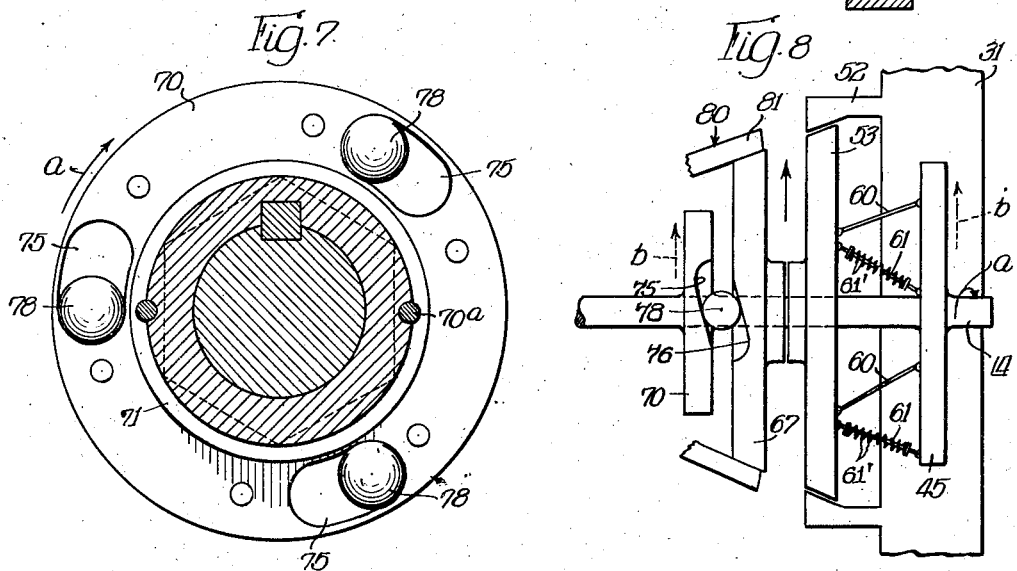
INVENTOR.
Clarence M Eason,
BY
Attys

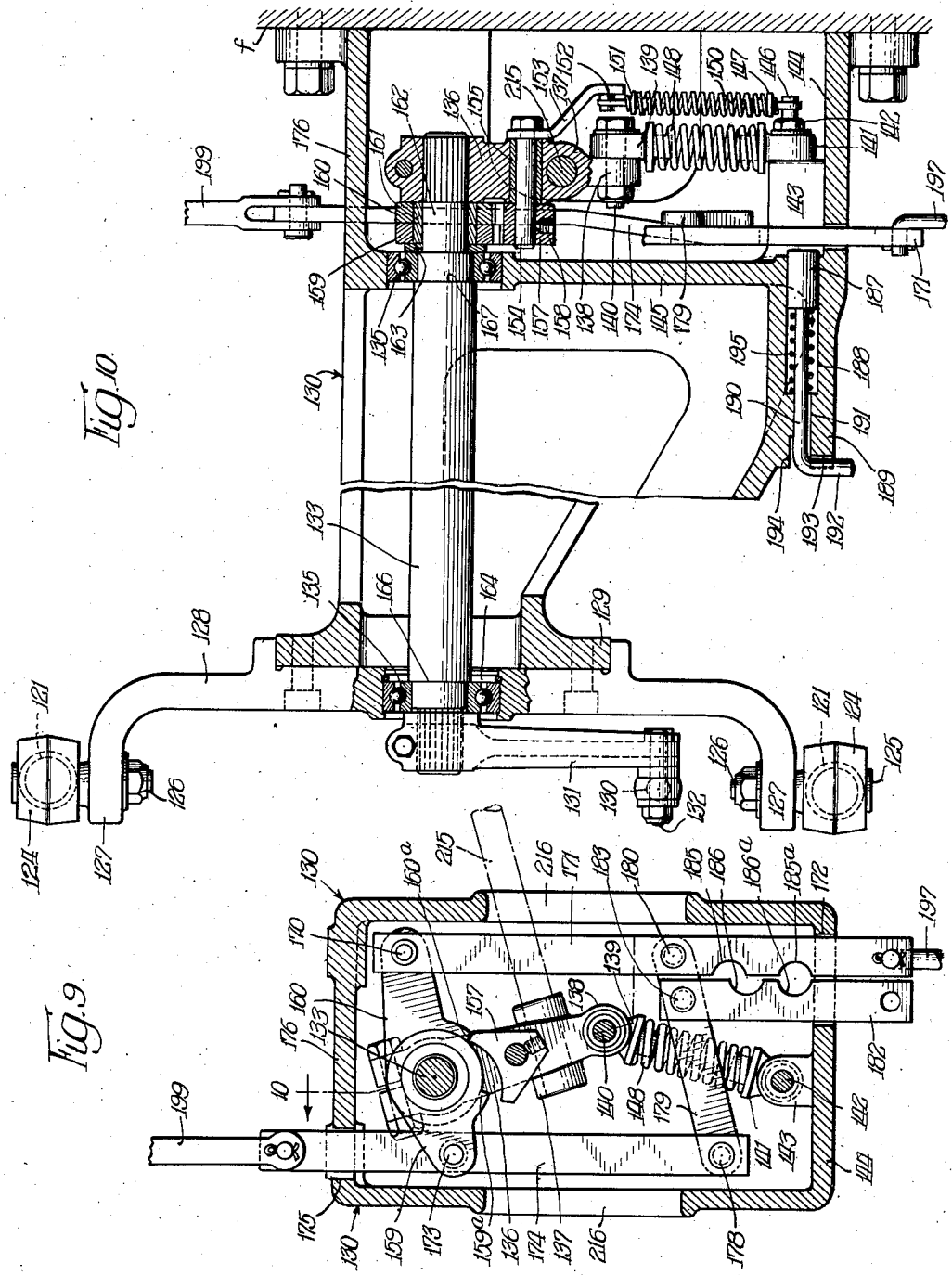

Patented Sept. 24, 1946

2,408,301

UNITED STATES PATENT OFFICE 2,408,301

CLUTCH

Clarence M. Eason, Waukesha, Wis.

Application January 22, 1943, Serial No. 473,208

33 Claims. (Cl. 192—36)

This invention relates to clutches, and has to do with a combined clutch and brake mechanism.

My invention is directed to clutch means of the character referred to comprising cooperating clutch and brake members including brake servo means associated therewith, the parts being so related and cooperating in such manner that in the act of applying the brake the clutch is released, and in releasing the brake the clutch is applied, assuring proper control of the operating parts at all times. More specifically, I provide an axially shiftable non-rotatable brake member and associated means whereby axial shifting of the brake member in one direction into nonbraking or releasing position effects the clutch engagement, and axial shifting of the brake member in the opposite direction into its operative or braking position effects the declutching operation, the latter operation being assisted by energy stored in the brake servo means by overrunning of the shaft controlled by the clutch incident to the declutching operation. The clutch is also preferably provided with self-energizing means which functions after initiation of the clutching operation to hold the friction clutch members, preferably cone members, in clutching contact under considerable pressure.

Another important aspect of the present invention is the use of the servo action for the interrupted rotating brake member, in order that the initial force applied to the non-rotating brake member may be held to very low values, such as may be readily controlled by means of a conventional foot treadle without causing undue fatigue of the operator.

Another important feature of my invention is that the clutching and declutching operation, accompanied by the concomitant relative movement of the braking member, out of and into cooperating braking contact, is effected by axial shifting of a non-rotatable brake member and in such manner that rotation of the clutch controlled shaft is not necessary for effecting the clutching and declutching operation. My improved clutch gives complete control of the driven shaft throughout the entire 360 degrees of rotation thereof and renders it possible to stop the shaft at any desired point in its rotation. A further and important practical advantage of the clutch of my invention is that it may be applied to a flywheel or analogous member of a press or like machine without necessitating objectionable changes in the flywheel and associated parts, particularly the bearings therefor.

Further objects and advantages of my invention will appear from the detailed description.

In the drawings:

Figure 4 is a fragmentary axial sectional view of the clutch means, partly broken away and in section to show the cam rings and balls and associated parts, on an enlarged scale;

Figure 5 is an outer end view of the movable inner cam ring for shifting the axially movable brake member;

Figure 6 is a sectional view taken substantially on line 6—6 of Figure 5;

Figure 7 is a sectional view taken substantially on line 7—7 of Figure 4;

Figure 8 is a diagrammatic view illustrating the relation between the clutch and the brake members, and the effect of the overrunning of the clutch controlled shaft and associated parts;

Figure 9 is a vertical transverse sectional view of the bracket supporting the clutch operating shaft, showing the over-center spring and pawl means of the clutch control mechanism; and Figure 10 is a sectional view taken substantially on line 10—10 of Figure 9, certain parts being shown in elevation and certain other parts being broken away.

I have illustrated the clutch mechanism of my invention as applied to a press of known type, by way of example, to which it is well suited, though it is to be understood that my clutch mechanism is in no way limited to that particular use, since it is suitable for many other purposes, and may be applied to any use to which it is suited. The press shown is a so-called back geared type where the clutch is located on a secondary or back shaft which, because of the gear reduction, makes several revolutions to one revolution of the main crank shaft. The clutch structure, however, can very readily be applied directly to the crank shaft and controlled by substantially the same type of mechanism which is used to control my improved clutch when mounted on a back shaft.

Figure 1:
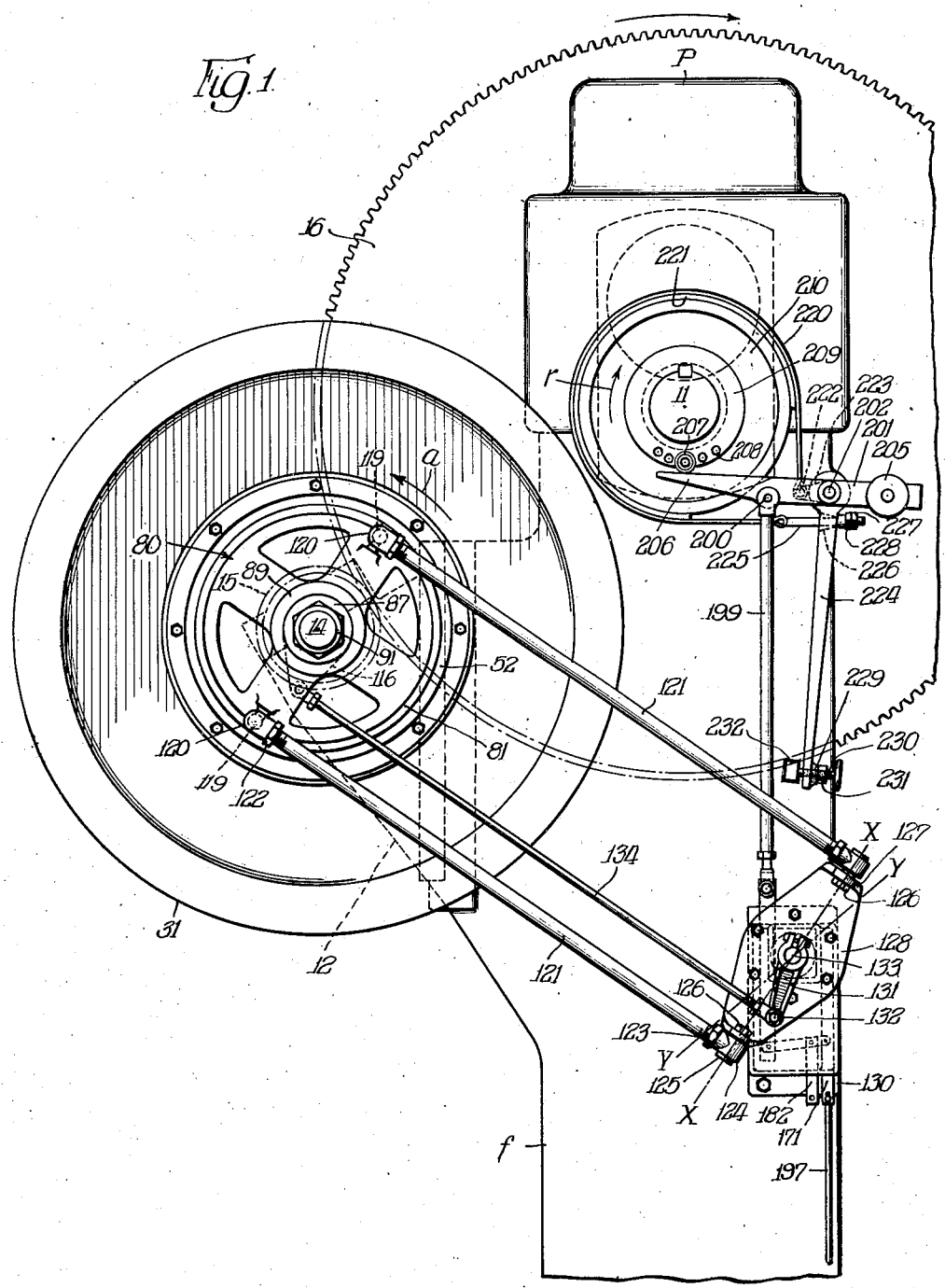
Figure 1 is a fragmentary side view of a press, with clutch means embodying my invention applied thereto.
Figure 2:
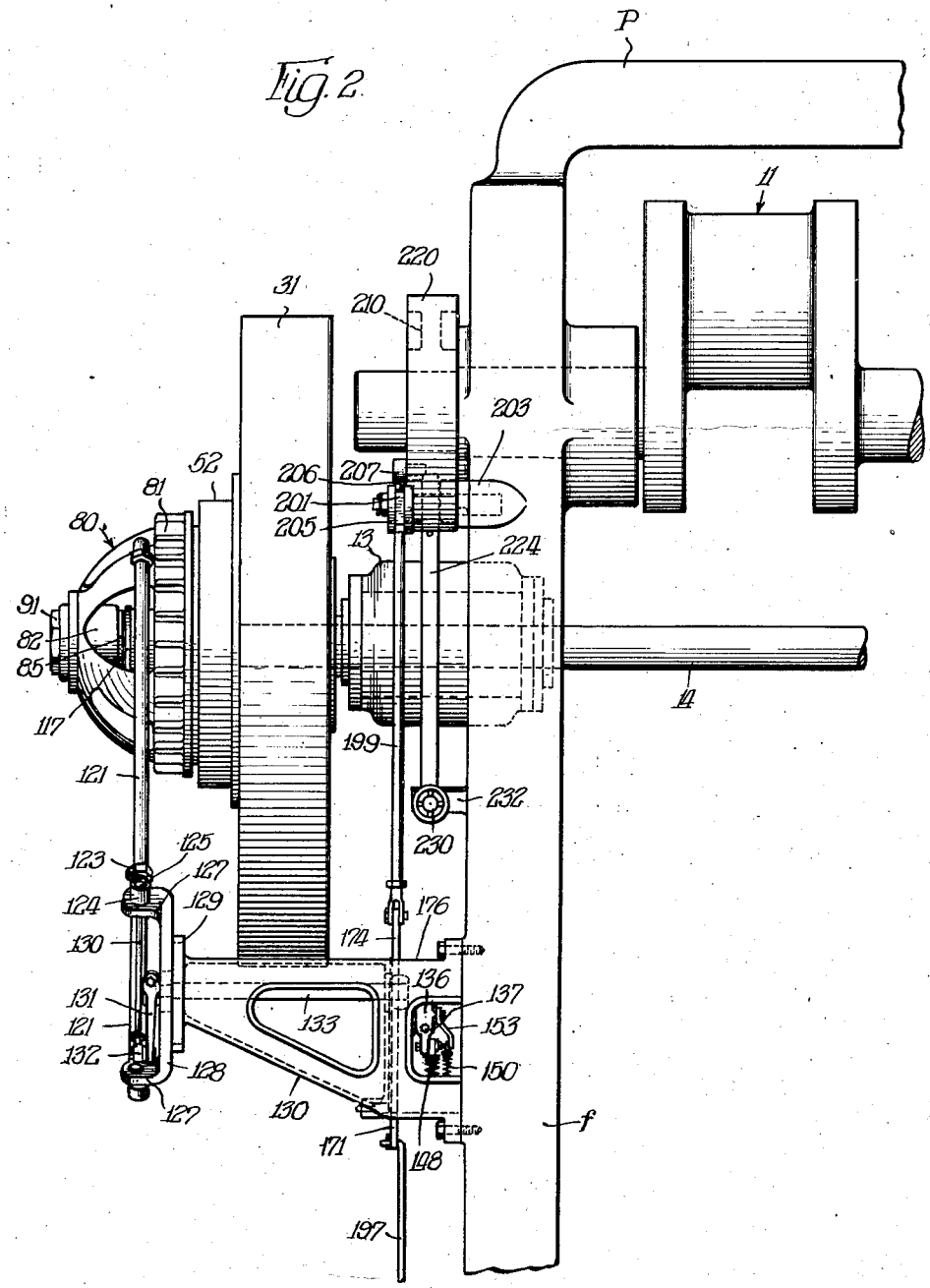
Figure 2 is a front view of the press and the clutch means shown in Figure 1.

In Figures 1 and 2 of the drawings I have shown fragmentarily a portion of a frame f of a press P of known type, this frame having mounted therein, in a suitable manner, a rotatable crank shaft 11. A bracket 12 is bolted or otherwise suitably secured to frame f at each side thereof and extends upward and rearward therefrom. Each of the brackets 12 supports a bearing structure 13, and these bearing structures rotatably support a back geared or secondary shaft 14 extending transversely of frame f below and in back of the crank shaft 11. It will be understood that the press is provided with a ram connected by a connecting rod to the crank of shaft 11, and associated parts, which have been omitted, for clearness of illustration and as not being necessary to a clear disclosure of my invention. A spur pinion 15 is keyed on one end of drive shaft 14, at the opposite side of frame f to that shown in Figure 1, and meshes with a gear 16 secured on the crank shaft 11 at the same side of the frame, whereby rotation of shaft 14 imparts rotation to the crank shaft.

Shaft 14 extends outwardly beyond the bearing structure 13 at the other side of frame f, that is, at the side thereof remote from pinion 15 and gear 16, and this portion of shaft 14 is tapered outward at 18 for a portion of its length, being provided at its outer end with a reduced threaded end 19. A comparatively heavy mounting collar 20 is rotatably supported on shaft 14, adjacent the side of frame f remote from pinion 15, by means of ball bearings 21 of known type, each having an inner race in the form of a relatively long sleeve 22 fitting about shaft 14, the sleeves being disposed in endwise contact. A flanged ring 23 is secured to shaft 14, by one or more dog-point set screws, one of which is shown at 24, with its flange engaging the rabbeted inner end of the inner sleeve 22 in endwise contact therewith. Collar 20 is provided, at its outer end, with an inwardly extending flange 25 extending about the outer end portion of the outer sleeve 22 and in contact with the outer race of the outer bearing 21, and is further provided, at its inner end, with an outwardly extending circumferential flange 26. The outer race of the outer bearing 21 contacts the inner face of flange 25 and restrains collar 20 against endwise movement inward along shaft 14, the outer bearing 21 thus functioning as a thrust bearing. Flange 26 is provided with a plurality of openings bored therein, one of which is shown at 27, these openings preferably being disposed close together. Two of these openings, preferably two diametrically opposite openings, receive reduced studs 28 at the inner ends of hollow plungers 29 slidably mounted in corresponding bores in the hub 30 of a flywheel 31 of suitable construction. Each of the plungers 29 is urged inward by a coil compression spring 32 extending thereinto and seating therein at its inner end, the outer end of spring 32 seating against a retaining ring 33 fitting in a corresponding annular groove in the outer end of hub 30 and bolted thereto. Ring 33 screws onto the threaded outer end portion 34 of collar 20. It will be seen that by rotating collar 20 relative to flywheel 31, the latter may be adjusted axially in either direction. For that purpose I preferably provide a spanner wrench having two studs equal in thickness to flange 26 and disposed to enter the two diametrically opposite openings 27 which receive the studs 28 of the plungers 29. By means of the stud of the spanner wrench, the stud 28 of the plunger may be displaced outwardly so as to release flange 26 from hub 30, after which the collar 20 may be turned by means of the spanner wrench a distance equal to that between two adjacent openings. By repeating that operation the flywheel 31 may be adjusted to the desired extent in either direction axially, for a purpose which will be explained more fully hereinafer. An oil seal member 36, of known type, is disposed within the inner end portion of collar 20, confined therein between the outer race of the inner bearing 21, the retaining ring 23, and a snap ring 37 engaging in a corresponding groove in the inner face of collar 20.

A tubular hub 40, having a tapered bore corresponding to the tapered portion 18 of shaft 14, is secured tightly on portion 18 of shaft 14 by a nut 41 screwing onto stud 19 and an associated lock washer 42 held in pressure contact with the outer end of hub 40 by nut 41. Hub 40 is further secured against rotation relative to shaft 14 by a key 43 engaging in keyways in hub 40 and in portion 18 of shaft 14, the lock washer 42 having a portion struck therefrom and engaging in the keyway of hub 40 at the outer end thereof. It will be seen that hub 40 is effectively secured to shaft 14 in a manner to prevent relative movement between these two members, and the inner end portion of this hub is interiorly recessed to accommodate the outer end portion of the sleeve 22 of the outer bearing 21. Hub 40 is also provided, at its inner end, with an exterior circumferential flange 45 having, at its outer circumference, a flange 46 extending outward lengthwise of hub 40. A loose thrust washer 48 preferably of non-metallic anti-friction material is interposed between the flanged end 25 of the flywheel adjusting sleeve 20 and the inner face of clutch hub 40. When the flywheel is rotating freely on its ball bearings 21, with the shaft and clutch stationary, there is a slight running clearance between these thrust surfaces, but when the clutch is engaged and there is no relative rotation between flywheel and clutch, the axial thrust reaction due to the servo strut action (to be later described) is transmitted directly from the clutch hub to the flywheel itself through this thrust washer. At no time is there any axial thrust on the ball bearings 21, due to clutch servo strut action. These bearings do not take end thrust except the very small amount which might be required to maintain the flywheel and the driving clutch cone in proper axial alignment. In this regard, it will be noted that the thrust ring 48, in its abutment against the outer end of collar 20, cooperates with the outer bearing 21 for restraining the mounting collar 20 and flywheel 31 against endwise movement in either direction.

A female clutch member 52, having an outwardly converging clutch surface, is suitably secured, conveniently by bolting, to flywheel 31 at the outer side thereof. Clutch member 52 cooperates with a male clutch member 53 having riveted thereto a clutch lining 54, the latter clutch member being bolted to a flanged ring 55 mounted about hub 40, the exterior surface of which is of stepped formation, as shown. A flanged collar 56 is secured to ring 55 by bolts, one of which is shown at 57, which secure collar 56 and clutch member 53 together, the bolts 57 screwing into the heavy flange at the outer end of collar 56, and clutch member 53 being rabbeted for reception of the flange of ring 55, the collar and the clutch member being thus effectively secured together with the flange of ring 55 clamped between the inner portion of clutch member 53 and the flange at the outer end of collar 56, bolts 57 positively securing the parts together.

Ring 55 and flange 45 of hub 40 are connected by clutch self-energizing mechanism comprising rigid struts 60 of dumbbell formation, constituting drive transmission members, and lengthwise compressible spring struts 61 constituting energy storing members. The struts 60 are inclined transversely of the axis of shaft 14 in such direction that they act under compression to transmit the drive from ring 55, when the clutch member 53 is driven, to flange 45 of hub 40, for rotating the shaft 14. The struts 61 are inclined oppositely to struts 60 and function both as energy storing members and as reverse drive members, as will be explained more fully later. In practice I usually provide three struts 60 and three struts 61, though a larger number of struts may be used if desired. Preferably, the struts are constructed and connected to the parts associated therewith in the manner shown and described in detail in my copending applications, Serial No. 279,899, filed June 19, 1939, and Serial No. 282,588, filed July 3, 1939, now issued as Patents 2,308,679 and 2,308,680, respectively. Within the broader aspects of my invention, however, any other suitable known type of struts may be used.

A cam ring 63 is mounted about the outer portion of hub 40 outward beyond ring 55, in endwise abutting relation thereto with an intervening thrust ring 64. Ring 63 is provided with an outwardly extending circumferential flange secured, as by means of bolts, one of which is shown at 65, to hub 66 of a male brake member 67 having an outwardly converging braking surface provided by a brake lining 68 riveted or otherwise suitably secured to the rim of member 67. A second cam ring 70, provided with an inner circumferential inwardly extending flange 71, is screwed on the outer end of hub 40, at 72, with flange 71 in abutment with a shoulder 73 of hub 40. Lock washer 42 is maintained in pressure contact with the outer end of ring 70 by nut 41. It will be seen that ring 70 is thus fixed on hub 40 for rotation therewith, and also provides an abutment member fixed against axial movement in either direction, whereas the male clutch member 53 and the male brake member 67 are disposed in endwise abutting relation and are mounted for axial movement relative to hub 40, as well as for turning movement thereabout, as will appear more fully later. Lock pins 70a further secure ring 70 against turning on hub 40.

As is shown more clearly in Figures 4 and 7, ring 70 is provided, in its inner face, with three equally spaced grooves or recesses 75 increasing in depth in the direction of rotation of ring 70 with hub 40 and shaft 14, indicated by the arrow a. Each of the grooves or recesses 75 is concentric with the axis of shaft 14, and these grooves or recesses are equidistant from such axis. The ring 63 is provided in its outer face with three grooves or recesses 76, corresponding to the grooves or recesses 75 but disposed reversely thereto, decreasing in depth in the direction of rotation of shaft 14 when that shaft is driven through the clutch means, in a manner to be described. The recesses or grooves 75 and 76 are arranged in cooperating pairs, the rings 63 and 70 being properly related to that end, and provide cam runways for steel balls 78 mounted therein. It will be seen that turning movement of ring 70 in the direction in which shaft 14 is driven, occurring while corresponding turning movement of the other cam ring 63 is being retarded or blocked, will cause the balls 78 to move into the shallower ends of the grooves 75 and 76, thus forcing cam ring 63 axially inwardly away from ring 70 a distance somewhat less than one-half the diameter of the respective balls 78, equal to approximately one-third of the diameter of the ball. At that time each of the balls 78 is at the shallow ends of the two cam runways, as will be clear from Figure 4, and, if the brake member 67 is held against rotation, to block further rotation of the cam ring 63, this will cause the clutch 52, 53 to become declutched and will function to stop rotation of shaft 14.

Brake member 67 cooperates with a female brake member 80 of dome shape, provided at its inner end with a rim 81 having an inner braking surface cooperating with the braking surface 68 of member 67. Brake member 80 is provided, at its outer end, with an inwardly extending hub 82 formed with an interior keyway 83 slidably receiving a key 84 seating in a corresponding recess in a bushing 85 fitting within hub 82. An adjusting nut 87, of cupped shape, is threaded on the outer end portion of bushing 85, this nut being provided at its inner end with an outwardly extending circumferential flange 88 seating against the outer end of hub 82. A flanged retaining ring 89 is secured to the outer end of brake member 80 by means of bolts, one of which is shown at 90, having socketed heads for reception of a suitable socket wrench. Brake member 80 is held against turning movement, but is free for axial shifting movement in either direction, as will be explained more fully later. Normally, flange 88 of nut 87 is clamped tightly between hub 82 and ring 89, effectively securing these parts together and restraining member 80 against axial movement relative to bushing 85. By slightly loosening the bolts 90, sufficiently to release the clamping action of ring 89, nut 87 may be rotated by means of a suitable wrench, for which purpose nut 87 is provided at its outer end with a hexagonal element 91, rotation of the nut serving to effect adjustment of brake member 80 axially along bushing 85 in the desired direction and to the desired extent, after which by tightening the bolts 90 the parts are clamped together as before.

A flanged cap 93 is bolted to cam ring 70, at the outer side thereof, and extends therefrom outward about and across the outer end of shaft 14. Cap 93 is provided, at its outer end, with a hub 94 disposed coaxially with shaft 14, in which is fixedly secured, by welding or in any other suitable manner, the inner end of a stub shaft 95. A thrust ball bearing 96 is mounted about the inner end portion of stub shaft 95, with its inner race abutting the outer end of hub 94, this bearing 96 being disposed in an annular recess in the inner face of a cam ring 97 shown more clearly in Figures 5 and 6. Ring 97 is provided with an outwardly projecting hub 98 having spaced slots therein providing outwardly extending coupling projections 99. A second cam ring 100 is disposed about stub shaft 95 outwardly thereof from ring 97, this second ring having in its outer face an annular recess receiving a ball bearing structure 101 the inner race of which is confined between ring 100 and a nut 102 threaded on a reduced screw stud 103 formed at the outer end of stub shaft 95, with an intervening lock washer 104. The cam ring 100 is similar in construction to the cam ring 97 and is provided with an inwardly extending hub 106 which is appropriately slotted to provide coupling projections disposed to engage between the projections 99 of ring 97, whereby the rings 97 and 100 are coupled together for turning movement as a unit. It will be seen that the cam rings 97 and 100 are restrained against axial movement away from each other, by the thrust ball bearings 95 and 101 and associated parts.

Figure 3:
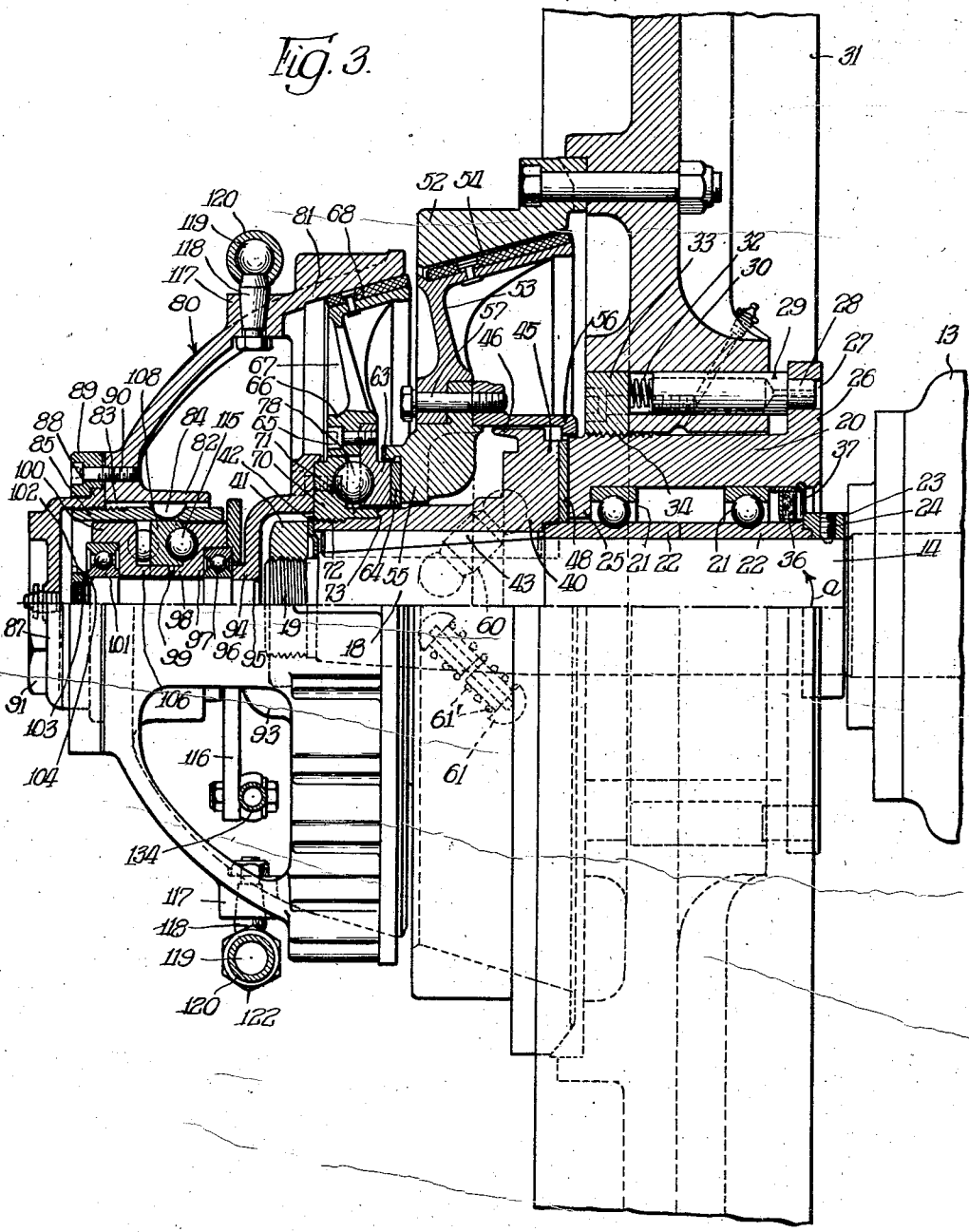
Figure 3 is a view, on an enlarged scale, of the clutch means and associated parts, shown in front elevation at the lower half of this view and in axial section at the upper half of this view, certain parts in the upper half being shown in elevation and certain parts being broken away.

The bushing 85 is slidably mounted on the cam rings 97 and 100 for relative axial movement in either direction, and this bushing supports the brake member 80 for relative axial movement in either direction, as above described. A cam shift ring 108 is disposed within bushing 85, between the rings 97 and 100, and is secured to bushing 85 by set screws 109. The axial extent or width of ring 108 is less than the axial distance between the rings 97 and 100, as will be clear from Figure 4. Cam ring 97 is provided in its outer face with three equally spaced grooves or depressions 111 which decrease in depth in the direction of rotation of shaft 14. The shift cam ring 108 is provided in its inner face with three grooves or recesses 112 which are reversed relative to the grooves or recesses 111 and, accordingly, increase in depth in the direction of rotation of shaft 14. At its outer face the shift cam ring 108 is provided with three grooves or recesses 113 disposed in the same manner as the grooves or recesses 111, and cam ring 100 is provided in its inner face with three grooves or recesses 114 disposed in the same manner as the grooves or recesses 112 in the inner face of the shift cam ring 108. It will be understood that the grooves or recesses 111 and 112, and the grooves or recesses 113 and 114 are disposed in cooperating pairs, each pair of grooves providing a cam runway for a steel ball 115 mounted therein. A brake lever 116, provided at its inner end with an annular head 117, is suitably secured, conveniently by rivets 118, to the inner end of cam ring 97. It will be clear that by moving lever 116 in one direction and thereby turning ring 97 in a direction opposite to the direction of rotation of shaft 14, the shift cam ring 108 will be forced to the left, as viewed in Figure 4, thus shifting the bushing 85 axially toward the left and with it the brake member 80, moving the latter away from brake member 67 into brake releasing position. By turning the brake lever in the opposite direction, and thereby imparting corresponding turning movement to the rings 97 and 100, the cam shift ring 108 will be forced to the right, into the position shown in Figure 4, being then spaced from ring 100 a distance somewhat less than one-half the diameter of the respective balls 115. This movement of ring 108 shifts the brake member 80 toward the right, as shown in Figure 3, into engaging and brake setting relation to the brake member 67. Preferably, the ball receiving recesses or runways of the rings 97 and 100 and 108 are disposed substantially tangent to a circle struck from the axis of stub shaft 85 which, as noted, is coaxial with shaft 14, rather than being substantially concentric with the axis of the latter shaft as are the recesses 75, 76 of rings 63, 70, since I find that this tangent arrangement of the grooves or recesses of the rings 97 and 100 and 108 is more efficient for obtaining the desired camming action.

Brake member 80 is provided, at diametrically opposite points thereof, with integral bosses 117 through which are secured pins 118, conveniently by nuts screwing on their inner ends, these pins being provided at their outer ends with substantially spherical heads 119. Heads 119 receive socket members 120 fitting thereabout, secured to the upper ends of thrust rods 121 in a suitable manner, conveniently by nuts 122 screwing upon the rods. The lower ends of rods 121 have secured thereon, conveniently by nuts 123 screwing onto the rods, eye members 124 which receive pivot pins 125 suitably secured, conveniently by nuts 126, to outwardly projecting arms 127 of a torque resisting yoke 128 bolted to a flange 129 at the outer end of a bracket 130 bolted to frame f of the press. The thrust rods 121 restrain brake member 80 against turning movement, while permitting axial movement of this member 80 in either direction, there being slight looseness between the members 119 and 120 of the ball and socket connections, sufficient to prevent objectionable binding in the shifting of brake member 80. A brake operating rod 134 is pivoted at its upper end to the lower end of brake lever 116, as shown in Figure 1, and extends therefrom to an arm 131 pivoted at its lower end, at 132, to the lower end of rod 134. Arm 131 is secured at its upper end upon the outer end of a shaft 133 rockably mounted through bracket 130. By turning shaft 133 in proper direction the cam ring 97 may be turned in either direction desired for shifting brake member 80 axially into brake releasing position or brake setting position relative to brake member 67, in the manner above described. Within the broader aspects of my invention, any other suitable means may be provided for imparting the desired turning movement to the cam rings 97, 100 in either direction.

In Figure 8 I have shown diagrammatically the parts in the positions which they occupy when the braking means has been set and the clutch member 53 has been shifted into declutched position. The arrow $a$ indicates the direction of rotation of shaft 14 when it is driven by the flywheel 31 through the clutch. Referring first to the mode of operation which occurs when the clutch structure is revolving, it will be seen that when the brake member 80 is shifted toward the right it engages brake member 67, thereby exerting braking action thereon, which retards or stops further rotation of this interruptable brake member 67 almost immediately. Thereupon, the continued rotation of the shaft 14 and the clutch releasing servo cam ring 70 acts through the servo balls 78 to shift the other cam ring 63 toward the right. This shifts the driven clutch element 53 towards and into its clutch releasing position, such being effected substantially entirely from servo energy. As the shiftable cam ring 63 and interruptable brake drum 67 shift toward the right in this servo-actuated clutch releasing operation, the controllable brake ring 80 follows up this shifting movement, continuing to maintain its frictional pressure against the interruptable brake member 67. The shifting of the driven clutch element 53 into clutch releasing position compresses the springs 61' of the spring distended reverse acting toggle struts 61, storing energy in these springs which is effective to reengage the clutch as soon as the controllable brake ring 80 is backed away from the interruptable brake drum 67 in the clutch engaging operation. The controllable brake member 80 may be shifted into this clutch releasing position solely under manual energy, or it may be actuated hydraulically or pneumatically, or it may respond to an automatic one-cycle stop mechanism which can be set to produce single trip operation or repeating operation of the punch press, as desired. In the embodiment illustrated, I have shown the controllable brake member 80 responding to such a mechanism. As will be described later, this automatic mechanism comprises a biasing spring 148 (Figures 9 and 10) which acts alternatively to shift the controllable brake member 80 either toward the clutch releasing position or toward the clutch engaging position. When said brake member is shifted toward its clutch releasing position this biasing spring 148 is operative to exert more pressure tending to move the brake member in this direction than the toggle springs 61' can exert in the opposite direction. Hence, when the clutch is released the brake member 80 remains in this clutch releasing position, shifted to the right in opposition to the pressure of the toggle springs 61'.

In this clutch releasing position of the parts, a braking force is also exerted on the driven shaft 14 from the brake members 67, 80. This braking force is effective through the cam ring 63, thrust washer 64, driven clutch element 53 and toggle struts to the driven shaft. The servo balls 78 are also operative to transmit braking force through the positive end stops at the opposite ends of the inclined runways 75, 76 and through the cam ring 70 to the driven shaft 14. Thus, braking retardation is continuously maintained on the driven shaft 14 so long as the clutch remains released. It should be noted that in the above described clutch releasing operation, the extremely high force which the clutch releasing servo mechanism 75, 76, 78 can exert is capable of freeing the clutch surfaces no matter how tightly they may be forced together. In the reverse operation of engaging the clutch, the controllable brake member 80 is merely backed away from the interruptable brake member 67 in a shifting movement toward the left. This permits the compression springs 61' on the spring struts 61 to shift the driven clutch element 53 back into clutch engaging position, whereupon the self-energizing struts 60 complete the high pressure engagement of the clutch surfaces. The clutch is now engaged and the brake released.

Referring now to the operation of the clutch when the flywheel is not being driven, the operation of releasing the clutch at this time is likewise performed by shifting the controllable brake member 80 to the right. This merely transmits corresponding shifting force to the then inert brake drum 67 which in turn is transmitted through the cam ring 63 and thrust washer 64 to the driven clutch element 53. Thus, this driven clutch element is shifted to clutch releasing position solely by shifting force imparted to controllable brake member 80, and without any servo boost. It will be seen that the clutching and declutching operations, accompanied by the brake releasing and the brake setting operations, may be performed at any point in the rotation of shaft 14, and, accordingly, of the crank shaft driven from shaft 14, which is advantageous in that rotation of shaft 14 or of the crank shaft of the press, through a definite angle or through a complete revolution is not necessary in order to effect either the declutching or the clutching operation.

From what has been said it will be seen that the clutch releasing operation, when shaft 14 is being driven, is started by movement of the brake member 80 in brake engaging direction, and is completed by servo energy derived from rotation of shaft 14; and the clutch engaging operation is started by movement of the brake member 80 in brake releasing direction and is completed by the self-energizing torque transmitted through the toggle struts 60, the brake means being set upon completion of the declutching operation and being released upon completion of the clutching operation, so that the brake means retains control until the clutching operation has been completed and until and after completion of the declutching operation. Further, when the shaft 14 is not being driven and is at standstill, as when the clutch is engaged and flywheel 31 is not being driven, the shaft 14 may be clutched to and declutched from the flywheel 31 by axial shifting of brake member 80 in proper direction, which is desirable to facilitate slight manual turning of the crank shaft of the press for making adjustments or for other purposes. In thus releasing the clutch with the shaft 14 at a standstill, the spring struts 61 are compressed to a certain extent, and upon movement of brake member 80 in brake releasing direction, the spring struts 61 are effective for moving clutch member 53 into cooperating contact with clutch member 52, though not under the high clutching pressure available when shaft 14 is being driven from flywheel 31 by the thrust then exerted by the strut members 60, as above explained. It is possible, however, to clutch and declutch the driving member or flywheel 31 to the driven member or shaft 14 when this shaft is at standstill, which is advantageous for the reasons stated.

While I preferably provide the cam balls and cam runways therefor for effecting axial shifting of the brake member 80 and of the ring 63, as reducing friction, the invention is not limited to this form of brake shifting means. Hydraulic means, pneumatic means and other forms of actuating means may be employed for effecting the axial shifting of brake member 80 in the desired direction and to the desired extent for cooperation with brake member 67 in the manner above described. The clutch member 53 may be slidably mounted on hub 40 and on flange 46 of this hub, by means of the ring 55 and collar 56, or, if desired, the clutch member 53 may have a floating mounting as provided by the self-energizing mechanism comprising the struts 60 and 61. Preferably I provide three struts 60 and three struts 61, though the number of struts employed may be varied within limits, but the minimum number of struts of each kind should be three, as will be understood.

As previously stated, any suitable means may be provided for operating the brake lever in proper direction to cause shifting of brake member 80 in the desired direction axially. I preferably provide, however, the control means shown herein and which will now be described. Shaft 133 is rockably mounted in ball bearings 135 suitably supported by bracket 130. An arm 136 is clamped on the inner end of shaft 133 and extends downward therefrom this arm being provided, at its lower portion, with an integral socket element 137 and, below socket element 137, with an integral eye 138 disposed substantially perpendicular to socket element 137. An upper spring abutment head 139 is pivoted to eye 138 by means of a pivot bolt 140 secured thereto by means of a nut and associated washer, and a lower spring abutment head 141 is pivoted, by means of a bolt 142, to a boss 143 formed integrally with the web elements 144 and 145 of bracket 130, defining with adjacent portions thereof a housing for arm 136 and the parts associated therewith. Bolt 142 is provided, at its inner end portion, with a reduced stud 146 on which is pivoted another spring abutment head 147. A relatively heavy compression spring 148 seats at its ends against heads 139 and 141 about short studs or necks extending therefrom, in a well known practice. A relatively light compression spring 150 has its lower end bearing against spring mounting head 147 and has its upper end bearing against another spring mounting head 151. The latter head is pivoted on a stud 152 secured in the lower end of an arm 153, the upper end of which is fixed on a pin 154 rockably mounted in a bushing 155 extending through arm 136 above and at right angles to socket element 137. A two arm pawl 157 is fixedly secured by a set screw 158 on pin 154 at the outer face of arm 136. Pawl 157 is disposed in the vertical plane of two arms 159 and 160 loosely mounted on a bushing 161 extending about reduced inner end portion 162 of shaft 133, the latter being of reduced diameter at the portion thereof passing through the inner race of the ball bearing 135, and there being a retaining ring 163 disposed about shaft 133, between bushing 161 and the adjacent bearing 135. A snap retainer ring 164, seated in a corresponding groove in yoke 128, in which the outer bearing 135 is disposed, contacts the outer race of this latter bearing and restrains it against endwise movement. Arm 131 contacts the inner race of the outer bearing 135, and, in cooperation with shoulder 166 of shaft 133, restrains this shaft against endwise movement. Ring 163 and shoulder 167 of shaft 133 cooperate with the inner bearing 135 to restrain these parts against relative axial movement, the arms 159 and 160 being confined between ring 163 and arm 136 and restrained thereby against relative movement axially of shaft 133. Arm 160 extends in a direction forwardly of the press frame $f$, or to the right as viewed in Figure 9, and arm 159 extends rearwardly, or to the left, as viewed in Figure 9. The forward end of arm 160 is pivoted at 170 to the upper end of a link 171 vertically movable through an opening 172 in web 144 of bracket 130. Arm 159 is pivoted, at its rearward end, at 173, to a link 174, this link being vertically movable through an opening 175 in top web 176 of bracket 130. Link 174 is pivoted adjacent its lower end, at 178, to the rearward end of a transverse link 179 pivoted at its forward end, at 180, to link 171. The arms 159 and 160 and the links 171 and 174 and 179 together constitute a linkage system substantially in the form of a parallelogram. A link 182 is pivoted at its upper end, at 183, to link 179 adjacent link 171, and depends from link 179 in position adjacent and parallel with link 171, and extends with the latter through opening 172. Link 171 is provided, at its lower portion and in its rearward edge, with two semi-circular recesses 185 and 185a, and link 182 is provided, in its forward edge, with two semi-circular recesses 186 and 186a. In the position of the parts shown in Figure 9, recesses 185a and 186a are in register and aligned with a plunger 187 slidable in a bore 188 in a boss 189 of bracket 130. Plunger 187 is provided with a stem 190 extending outward therefrom through a reduced bore 191 opening into bore 188. The outer portion of stem 190 is bent at right angles to provide a handle and stop element 192 for engagement in either one of two notches 193 and 194 in the outer end of boss 189. A compression coil spring 195 is disposed about stem 190, within bore 188, and confined between plunger 187 and the outer end wall of bore 188. In the position of the plunger shown in Figure 10, handle 192 is engaged in notch 193, which is of less depth than notch 194, thereby holding plunger 187 in its retracted position. By pulling the plunger outward slightly, so as to disengage handle 192 from notch 193, and turning it so as to position handle 192 in notch 194, the plunger 187 is projected, upon release of handle 192, so as to engage through the opening defined either by the lower cooperating recesses 185a, 186a or by the upper cooperating recesses 185, 186, depending upon whether the links 171, 182 are in their upper positions (Figure 9) or in their lower positions. These locking functions will be later described. The links 171 and 182 are adapted to be pulled downwardly by actuating means which is typically illustrated by a foot treadle, although other actuating means may be employed if desired. This foot treadle is connected to the lower end of an operating rod 197 which has a laterally bent upper end 197' adapted for alternative pivotal connection either in a hole 198 in the lower end of link 171, or in a hole 198a in the lower end of link 182. When the operating rod 197 is coupled to hole 198 of link 171 the control mechanism is thereby rendered operative to cause a single stroke or one-cycle operation of the press when the foot treadle is depressed. When the operating rod 197 is coupled to hole 198a of link 182 the control mechanism is thereby rendered operative to cause continuous repeating operation of the press when the foot treadle is depressed. Referring now to the locking functions of the recesses 185—186 and 185a—186a, when the locking plunger 187 is projected through the recesses 185a and 186a, with both links 171 and 182 in their raised clutch releasing positions, the clutch is thereby locked out so that the press cannot have any type of operation. Conversely, when the locking plunger 187 is projected through the other recesses 185, 186, with both links 171 and 182 in their lower clutch engaging positions, the clutch is held in engagement so that the crank shaft 11 can be manually rotated or inched around for die setting purposes.

Link 174 is pivoted at its upper end to a power actuated trip rod 199 which in turn is pivoted at its upper end (Figure 1) at 200 to a trip lever 201 pivoted at a point intermediate its ends on a stud 202 secured in a boss 203 secured to the front of the press frame $f$. A counterweight 205 is suitably mounted on trip lever 201 forwardly of pivot stud 202, and urges the rearward arm 206 thereof upward into the path of a trip roller 207 mounted on a pivot bolt adapted to be screwed into any one, selectively, of a series of tapped bores 208 in the hub 209 of a brake drum 210 keyed on crank shaft 11 of the press.

It will be clear from Figure 9 that arm 136 and compression spring 148 together constitute a toggle, and that the compression spring 148 is an over-center spring. The pressure of this over-center spring is dominant over the pressure of the toggle strut springs 61' and is capable of disengaging the clutch in opposition to the action of said latter springs. In Figure 9 the parts are shown in the positions which they occupy when arm 206 of trip lever 201 is in its depressed position shown in Figure 1. At that time one arm of pawl 157 is disposed in contact with and beneath a shoulder 160a of arm 160. Arm 136 is then held by compression spring 148 in its position shown in Figure 9, and shaft 133 has been turned into such position that arm 131 is disposed as shown in Figure 1. The brake lever of the clutch mechanism is then in its position in which the braking mechanism is set and the members of the clutch are declutched. In the brake setting and declutching operation the shaft 14 overruns to a certain extent, as does the crank shaft 11 of the press, the overrun of the latter shaft being sufficient to move the trip roller 207 clear of trip lever 206. When it is desired to again operate the press, the treadle is depressed, moving link 171 of Figure 9 downward. That swings arm 160 downward about shaft 133 and, since shoulder 160a of arm 160 is in contact with one arm of pawl 157 (this pawl arm also riding on the peripheries of the hub portions of the arms 160 and 159) arm 136 is swung toward the left, as viewed in Figure 9, turning the shaft 133 in clockwise direction. When the pivot bolt 140 is in dead center position relative to pivot stud 142 and shaft 133, the arm 131 is in the position indicated by the line x—x of Figure 1. When bolt 140 passes beyond dead center position, the compression spring 148 expands, turning shaft 133 a further distance in clockwise direction and moving arm 131 to the position indicated by the line y—y of Figure 1. The brake lever is then in its clutch engaging and brake releasing position, thus setting the clutch and releasing the brake. During swinging movement of arm 136 from its position shown in Figure 9 to its opposite position, the secondary compression spring 150 imparts turning movement to pawl 157 in clockwise direction, through arm 153 and pin 154, spring 150 also being an over-center spring similarly to spring 148. As a result of this turning movement of pawl 157, combined with the swinging movement of arm 136, when this latter arm reaches its opposite position to that shown in Figure 9, the other arm of pawl 157 is disposed beneath a shoulder 159a of arm 159 and in contact with the peripheral hub portion of this arm and of arm 160, as before. It will be apparent that when arm 136 has been moved into its opposite position to that shown in Figure 9, arm 159 is in raised position, with pawl 157 engaged beneath shoulder 159a, and arm 160 is in its lowered position, with pawl 157 out of contact with shoulder 160a thereof. In that position of the parts, link 171 is in its lowered position, and recess 185 thereof is in register with recess 186 of link 182, both of these links being lowered into such position that the opening defined by the recesses 185 and 186 is aligned with plunger 187. If continuous operation of the press is desired at this time, the handle 192 of plunger 187 is disengaged from notch 193 and placed in notch 194, permitting the plunger 187 to be projected through the recesses 185 and 186, thus locking the links 171 and 182 against upward movement and locking shaft 133 against turning movement so that arm 131 is held in its brake releasing and clutch setting position. The trip roller 207 may also be removed from the brake drum 210. If, on the other hand, cyclical operation of the press is desired, the plunger 187 remains in its retracted position. Under such conditions, the treadle is depressed, causing movement of arm 136 into its clutch engaging and brake releasing position, after which the treadle may be released. The cam shaft 11 then turns through a complete revolution, at the end of which trip roller 207 contacts arm 206 of trip lever 201, forcing arm 206 downward and returning arm 136 to its position shown in Figure 9. The links 171 and 182 are then disposed as shown in Figure 9, corresponding to a brake-engaging, clutch-releasing relation of the mechanism. If desired, the links 171 and 182 may be locked in this position by means of the plunger 187, thus locking arm 136 in its brake setting and declutching position so as to guard against any possibility of accidental operation of the press, as when making adjustments, changing die blocks, or in any other case where it is desirable to guard against unwanted operation of the press.

Movement of brake lever 116 in the brake engaging direction of movement is not limited but continues during the follow-up motion of the controllable brake member 80. Movement of said lever in the opposite direction may be limited by the associated means for shifting brake member 80 after the brake has been released, as will be readily understood. The over-center spring 148 assures full throw of said brake lever in either direction and retains it in either its brake releasing and clutch applying position or in its brake setting and clutch releasing position, while also providing yielding operating means accommodating and compensating for wear of parts in a manner to assure proper and reliable operation of the brake-clutch mechanism. The control means, comprising the toggle and spring arrangement shown and described, is well suited for use with the brake-clutch mechanism of my invention but, in its broader aspects, may be used to advantage with other brake or clutch mechanisms controlled by a lever having limited throw in opposite directions, or to analogous mechanisms.

The socket element 137 of arm 136 is intended for the reception of a suitable rod or handle 215, indicated in dot and dash lines in Figure 9, insertible through either one of two openings 216 in bracket 130. By means of handle 215, arm 136 may be quickly swung into either of its two positions for manually engaging the clutch or releasing the clutch. Sufficient leverage can be exerted through this manual handle to release the clutch even though the clutch surfaces have become tightly wedged together by the self-energizing action of the toggle struts 60. This manual control is often advantageous for effecting slight rotation of crank shaft 11 of the press, or for inching the press, when making adjustments, etc. Still further, the mechanism can be readily converted solely to manual control for normal running by removing the tripping roller 207 and then operating the clutch in each direction by the manual handle 215.

Preferably, I provide a drag brake for retarding any objectionable overrunning of the press crank shaft 11. To that end, a flexible brake band 220, provided with a suitable brake lining 221, is passed about brake drum 210, one end of this band 220 being anchored, at 222, to a short arm 223 integral with a bell-crank brake lever 224 pivoted at its upper end on stud 202. The other end of brake band 220 is attached to a link 225 passing through a flared opening 226 in lever 224, the outer or forward end portion of this link being threaded for reception of adjusting nuts 227 and 228 screwing thereon, nut 228 having a rounded bearing surface contacting lever 224. At its lower end lever 224 is provided with a boss 229 through which is threaded an adjusting screw 230 on which is threaded a jam nut 231. The rearward end of screw 230 bears against a lug 232 of the press frame f. It will be apparent that this screw 230 is a pressure screw effective for adjusting the tension of brake band 220, and that the brake band and its lining 221 cooperate with brake drum 210 for exerting a braking effect upon crank shaft 11 so as to prevent objectionable overrun thereof while not objectionably interfering with rotation of the crank shaft in the normal operation of the press.

As above indicated, it will be understood that changes in construction and arrangement of parts of my invention may be resorted to without departing from the field and scope thereof, and I intend to include all such variations, as fall within the scope of the appended claims in this application, in which the preferred form only of my invention has been disclosed. As illustrative of one such modification or alternative construction, the above described operating relation might be reversed so that the spring 148 would be released by manual tripping transmitted from the foot treadle and would be compressed by power tripping transmitted from the tripping roller 207. The same mechanism can be used by reversing the attachment of the parts, as to the links 171 and 174, making suitable provision for an increase of throw of the mechanism actuated by the tripping roller 207, and also reversing the relative throw of the double-acting ball cam mechanism 97, 100, 108, 111—115.

I claim:

1. In clutch mechanism, the combination of a driving member, a rotatable driven member, a self-energizing axially shiftable clutch spring-biased to engage by shifting movement in one direction, and control apparatus for said clutch comprising a servo action axially shiftable brake spring-biased to engage by shifting movement in the other direction, the spring biasing force of said brake being operative to overcome the spring biasing force of said clutch.

2. In clutch mechanism, the combination of a driving member, a rotatable driven member, a self-energizing axially shiftable clutch, spring means operative to axially shift said clutch into engagement in one direction, control apparatus for said clutch comprising a servo action axially shiftable brake, and spring means operative to axially shift said brake into engagement in a direction opposite to the direction of engagement of said clutch, said last named spring means being dominant over said first named spring means.

3. In a clutch, a driving member, a rotatable driven member, braking means for applying a braking force to said driven member comprising a non-rotatable brake member axially shiftable into brake setting position and brake releasing position, and means whereby releasing and setting of said braking means clutches and declutches said drive member to and from said driven member when the latter is at standstill.

4. In a clutch, a driving member, a rotatable driven member, braking means for stopping and holding said driven member against rotation comprising an axially shiftable rotatable brake member and a cooperating non-rotatable brake member axially shiftable into brake setting position and brake releasing position relative to said rotatable brake member, means whereby said rotatable brake member is shifted axially in one direction responsive to release of said braking means and in the opposite direction responsive to setting of said braking means, and self-energizing clutch means whereby said drive member is clutched to and declutched from said driven member responsive to axial shifting of said rotatable brake member in said one direction and in said opposite direction.

5. In a clutch, a driving member, a rotatable driven member, braking means therefor comprising a rotatable axially shiftable brake member and a cooperating non-rotatable brake member axially shiftable into brake setting position and brake releasing position relative to said rotatable brake member, means whereby said rotatable brake member is shifted axially in one direction responsive to release of said braking means and in the opposite direction responsive to setting of said braking means, supplementary means comprising self-energizing mechanism whereby said drive member is clutched to and declutched from said driven member responsive to axial shifting of said rotatable brake member in said one direction and in said opposite direction, and means for enabling said braking means to impose braking retardation on said driven member through said self-energizing mechanism.

6. In a clutch, a driving member, a rotatable driven member, braking means therefor comprising a non-rotatable brake member axially shiftable into braking position and brake releasing position, and means actuated by axial movement of said brake member whereby releasing and setting of said braking means clutches and declutches said drive member to and from said driven member, and also releases and applies braking force to and from said driven member.

7. In a clutch, a driving member, a rotatable driven member, braking means for holding said driven member against rotation comprising a non-rotatable brake member axially shiftable in one direction into braking position and in the opposite direction into releasing position, and means actuated by axial movement of said brake member whereby releasing and setting of said braking means clutches and declutches said drive member to and from said driven member.

8. In a clutch, a driving member, a rotatable driven member, braking means for applying braking force to said driven member comprising a non-rotatable brake member axially shiftable in one direction into braking position and in the opposite direction into releasing position, and means whereby releasing and setting of said braking means clutches and declutches said drive member to and from said driven member, said last means comprising a clutch member movable axially in the same direction with the shifting movement of said brake member.

9. In a clutch, a driving member, a rotatable driven member, braking means for holding said driven member against rotation comprising a non-rotatable braking member axially shiftable in one direction into braking position and in the opposite direction into releasing position, means actuated by axial movement of said brake member whereby release and setting of said braking means initiates clutching and declutching of said drive member to and from said driven member, and biasing spring means operative to cause the clutching and declutching operations initiated by said brake member to be completed.

10. In a clutch, a driving member, a rotatable driven member, braking means for stopping said driven member and holding it against rotation, said braking means comprising a non-rotatable braking member axially shiftable in one direction into braking position and in the opposite direction into releasing position, means actuated by axial movement of said brake member whereby release and setting of said braking means initiates clutching and declutching of said drive member to and from said driven member, and supplementary means whereby the clutching and declutching operations initiated by said brake member are completed, said braking means being released only upon completion of the clutching operation and said declutching operation being completed only upon setting of said braking means.

11. In a clutch, a driving member, a rotatable driven member, braking means for holding said driven member against rotation, comprising a non-rotatable brake member axially shiftable in one direction into braking position and in the opposite direction into releasing position, means actuated by axial movement of said brake member whereby release and setting of said braking means initiates clutching and declutching of said drive member to and from said driven member, and supplementary means comprising servo mechanism receiving rotative energy from said rotatable driven member and arranged whereby the declutching operations initiated by said brake member are assisted by servo energy.

12. In combination, a rotatable driving member, a rotatable driven member, a clutch for coupling said members together, self-energizing mechanism for actuating said clutch, and brake means for controlling said self-energizing mechanism comprising an axially shiftable rotatable brake member and a co-acting axially shiftable non-rotatable brake member, said brake means being operative to apply braking retardation to said rotatable driven member through said axially shiftable non-rotatable brake member when said clutch is released.

13. In combination, a rotatable driving member, a rotatable driven member, a clutch therebetween, self-energizing mechanism for actuating said clutch, said self-energizing mechanism comprising two cooperating relatively rotatable self-energizing members adapted to have relative axial movement occur therebetween when one of said self-energizing members is rotated relatively to the other, means for driving one of said self-energizing members from said rotary driven member, braking means for retarding rotation of the other self-energizing member to cause relative axial movement between said self-energizing members, said braking means comprising an axially shiftable rotatable brake member and a co-acting manually controlled axially shiftable non-rotatable brake member, means for transmitting said relative axial movement to said clutch for controlling the latter, and means enabling said braking means to stop said driven member and to hold it against rotation after release of said clutch.

14. In a clutch, a driving member, a rotatable driven member, braking means for stopping said driven member and holding it against rotation, said braking means comprising an axially shiftable rotatable brake member and a cooperating non-rotatable brake member axially shiftable into brake setting position and brake releasing position relative to said rotatable brake member, the latter member being axially movable by said non-rotatable member in the movement thereof in brake setting direction, clutch means comprising a shiftable clutch member for clutching and declutching said driving member to and from said driven member, said clutch member shifting axially directly with and in the same direction as said rotatable brake member into declutching position in the brake setting operation and into clutching position in the brake releasing operation, and self-energizing mechanism whereby said clutch member is moved into clutching position and declutching position responsive to setting and releasing of said braking means.

15. In a clutch, a rotatable shaft, a driving clutch member, a hub fixed on said shaft, a driven clutch member mounted on said hub for relative axial and turning movement, self-energizing means connecting said driven clutch member and said hub comprising drive transmitting struts, an abutment member fixed on said hub, a brake member mounted on said hub for relative axial and turning movement between said abutment member and said driven clutch member in endwise abutment with the latter, and a non-rotatable brake member axially shiftable into brake setting position and brake releasing position relative to said first brake member, said second brake member moving said first brake member axially and thereby moving said driven clutch member axially into declutching position during the brake setting operation, and said self-energizing means moving said driven clutch member axially into clutching position and thereby imparting similar axial movement to said first brake member during the brake releasing operation.

16. In a clutch, a rotatable shaft, a driving clutch member, a hub fixed on said shaft, a driven clutch member mounted on said hub for relative axial and turning movement, self-energizing means connecting said driven clutch member and said hub comprising drive transmitting struts and oppositely related yielding energy storing struts, an abutment member fixed on said hub, a brake member mounted on said hub for relative axial and turning movement between said abutment member and said driven clutch member in endwise abutment with the latter, said brake member and said abutment member having cooperating cam means whereby said brake member is moved axially in a direction toward and in a direction away from said driven clutch member responsive to turning of said brake member in one direction and in the opposite direction, and a non-rotatable brake member axially shiftable into brake setting position and brake releasing position relative to said first brake member, said second brake member moving said first brake member axially and in cooperation with said self-energizing means causing turning of said driven clutch member and said first brake member in said one direction thereby moving said driven clutch member axially into declutching position during the brake setting operation, said yielding struts being compressed by overrunning of said shaft after declutching and setting of the braking means, said self-energizing means acting to turn said driven clutch member and said first brake member in said opposite direction and to thereby move said driven clutch into clutching position during the brake releasing operation.

17. In a clutch, a rotatable shaft, a female driving cone clutch member having an outwardly converging clutching surface, a hub fixed on said shaft, a driven male cone clutch member mounted on said hub for relative axial and turning movement cooperating with said female member, self-energizing means connecting said hub and said male member comprising drive transmitting struts, an abutment member fixed on said hub outward from said male member, a male cone brake member mounted on said hub for relative axial and turning movement between said abutment member and said male clutch member, said brake member having an outwardly converging braking surface, a cooperating non-rotatable female brake member axially shiftable into brake setting position and brake releasing position relative to said male brake member, and means whereby setting said braking means shifts said male clutch member axially into de-clutching position, said self-energizing means moving said male clutch member axially outward into clutching position in the brake releasing operation.

18. In a clutch, a pair of driving and driven cone clutch members, one of said members being axially shiftable relative to the other into declutching position and clutching position, a pair of axially shiftable cooperating cone brake members operative to apply braking force to said driven clutch member, one of said brake members being axially shiftable relative to the other into brake setting position and brake releasing position, and means whereby setting and releasing of said braking means shifts said one clutch member axially into declutching position and into clutching position.

19. In a clutch, a female cone clutch member having an outwardly converging clutching surface, a cooperating male cone clutch member axially shiftable into clutching position and declutching position, an axially shiftable male cone brake member disposed outward of said male clutch member and having an outwardly converging clutching surface, a cooperating female cone brake member axially shiftable into brake setting position and brake releasing position relative to said male brake member, and means whereby setting and release of said braking means shifts said male clutch member axially into declutching position and clutching position, said latter means enabling said brake members to hold said male clutch member against rotation when said clutch is disengaged.

20. In a clutch, a female cone clutch member, a cooperating male cone clutch member axially shiftable into clutching position and declutching position, an axially shiftable male cone brake member, a cooperating female cone brake member axially shiftable into brake setting position and brake releasing position relative to said male brake member, the clutching surfaces of said clutch members and the braking surfaces of said brake members being similarly inclined, and means whereby setting and release of said braking means shifts said male clutch member axially into declutching position and clutching position, and applies braking retardation to said male clutch member when in declutching position.

21. In a clutch, a pair of cooperating driving and driven cone clutch members, a pair of cooperating cone brake members one axially shiftable relative to the other into brake setting position and brake releasing position relative thereto and said other brake member being axially shiftable with said one brake member in continued movement of the latter in brake setting direction and in brake releasing direction, and means whereby setting and release of said braking means shifts one of said clutch members into declutching position and clutching position, and also applies braking force to the driven clutch member for holding it against rotation in said declutching position.

22. In a clutch, a pair of cooperating driving and driven cone clutch members, a pair of cooperating cone brake members, one of said brake members being non-rotatable and axially shiftable relative to the other brake member into brake setting position and brake releasing position relative thereto and said other brake member being axially shiftable with said one brake member in continued movement of the latter in brake setting direction and in brake releasing direction, and means whereby setting and release of said braking means shifts one of said clutch members into declutching position and clutching position, and applies braking force to the driven clutch member in said declutching position.

23. In a clutch, a female cone clutch member, a cooperating male cone clutch member axially shiftable into clutching position and declutching position, an axially shiftable male cone brake member disposed in endwise abutting relation to said male clutch member, a cooperating female cone brake member axially shiftable into brake setting position and brake releasing position relative to said male brake member, the latter being axially shiftable with said female brake member in continued movement thereof in brake setting direction and brake releasing direction, continued movement of said female brake member in brake setting direction shifting said male cone clutch member axially into declutching position and applying braking retardation to said male clutch member for stopping rotation thereof, and supplementary means whereby release of said braking means shifts said male clutch member axially into clutching position.

24. In combination, clutch means, brake means governing said clutch means comprising a rotatable axially shiftable brake member and a cooperating non-rotatable axially shiftable brake member, control mechanism for controlling said latter brake member comprising a shift lever with limited movement in opposite directions into two operative positions, manual means for moving said lever in one direction a distance less than its full throw, power means responsive to the engagement of said clutch means for moving said lever in the opposite direction a distance less than its full throw, and yielding means for completing the throw of said lever in either direction.

25. In combination, clutch means, brake means governing said clutch means comprising a rotatable axially shiftable brake member and a cooperating non-rotatable axially shiftable brake member, control mechanism for controlling said latter brake member comprising a shift lever with limited movement in opposite directions into two operative positions, a rockably mounted arm connected to said lever, toggle means connected to said arm, and mechanism for turning said arm in either direction beyond dead center position of said toggle means comprising power driven means responsive to said clutch means for effecting the turning in one direction, said toggle means comprising an over center spring effective for completing the throw of said arm and said lever in either direction.

26. In combination, clutch means, brake means governing said clutch means comprising a rotatable axially shiftable brake member and a cooperating non-rotatable axially shiftable brake member, control mechanism for controlling said latter brake member comprising a shift lever with limited movement in opposite directions into two operative positions, a rockably mounted shaft, an operating arm secured on said shaft having operating connection to said lever, toggle means connected to said shaft, and manual means and power means responsive to said clutch means for turning said shaft in either direction beyond dead center position of said toggle means, the latter comprising an over center spring effective for completing the throw of said arm and said lever in either direction.

27. In clutch mechanism for punch presses and the like, the combination of a driven shaft, a clutch controlling the rotation of said shaft, brake means governing said clutch comprising a non-rotatable axially shiftable brake member, a foot treadle for shifting said brake member in one direction for initiating the engagement of said clutch, power means actuated by said driven shaft for shifting said brake member in the opposite direction for effecting the disengagement of said clutch, and automatic control mechanism responsive to said foot treadle and to said power means for controlling the shifting of said brake member, said control mechanism comprising a first actuating member to which said foot treadle is adapted to be connected for producing single stroke operation of the punch press, and a second actuating member to which said foot treadle is adapted to be connected for producing repeating operation of the punch press.

28. In combination, clutch means, brake means governing said clutch means comprising a rotatable axially shiftable brake member and a cooperating non-rotatable axially shiftable brake member, control mechanism for controlling said latter brake member comprising a rockably mounted shaft, toggle means comprising an operating arm secured at one end on said shaft and an over center compression spring connected to the other end of said arm, linkage and pawl means for turning said shaft in either direction beyond dead center position of said toggle means, said spring completing throw of said shaft in either direction, manual means for actuating said linkage and pawl means in one direction, and power means responsive to said clutch means for actuating said linkage and pawl means in the other direction.

29. In combination, clutch means, brake means governing said clutch means comprising a rotatable axially shiftable brake member and a cooperating non-rotatable axially shiftable brake member, control mechanism for controlling said latter brake member comprising a rockably mounted shaft, toggle means comprising an operating arm secured at one end on said shaft and an over center compression spring connected to the other end of said arm, means comprising a linkage parallelogram distortable from a first position to a second position for turning said shaft in either direction beyond dead center position of said toggle means, manual means for actuating said parallelogram in one direction, power means responsive to said clutch means for actuating said parallelogram in the opposite direction, and means for locking said linkage parallelogram against distortion in either of its said positions.

30. In combination, clutch means, brake means governing said clutch means comprising a rotatable axially shiftable brake member and a cooperating non-rotatable axially shiftable brake member, control mechanism for controlling said latter brake member comprising a rockably mounted shaft, two arms loosely mounted about said shaft projecting oppositely therefrom, an end link substantially parallel with said arms, two side links connecting the outer ends of said arms to said end link forming therewith a parallelogram, manual means for imparting endwise movement to one of said side links, power means responsive to the engagement of said clutch means for imparting endwise movement to the other of said side links, and means cooperating with said arms and with said shaft for rocking the latter in opposite directions responsive to endwise movement of said side links.

31. In combination, clutch means, brake means governing said clutch means comprising a rotatable axially shiftable brake member and a cooperating non-rotatable axially shiftable brake member, control mechanism for controlling said latter brake member comprising a rockably mounted shaft, two arms loosely mounted about said shaft projecting oppositely therefrom, an end link substantially parallel with said arms, two side links connecting the outer ends of said arms to said end link forming therewith a parallelogram, power means responsive to said clutch means and manual means for imparting endwise movement to either of said side links, means cooperating with said arms and with said shaft for rocking the latter in opposite directions responsive to endwise movement of said side links, and means for locking said parallelogram against movement in either position of said shaft.

32. In combination, clutch means, brake means governing said clutch means comprising a non-rotatable axially shiftable brake member, control mechanism for controlling said brake member comprising a rockably mounted shaft, toggle means comprising an operating arm secured at one end on said shaft and an over center compression spring connected to the other end of said arm, two arms loosely mounted about said shaft projecting oppositely therefrom, an end link below said shaft substantially parallel with said arms, two side links connecting the outer ends of said loosely mounted arms and said end link forming therewith a parallelogram, a pawl pivoted on said operating arm, said pawl and said loosely mounted arms having cooperating elements for turning said shaft beyond dead center position of said toggle means in one direction when one of said side links is moved downward and in the other direction when the other side link is moved downward, an over center compression spring for positioning said pawl in cooperating relation to the respective loosely mounted arms responsive to movement of said operating arm from one position to the other, manual means for actuating one of said side links, and power means responsive to the engagement of said clutch means for actuating the other of said side links.

33. In combination, clutch means, brake means governing said clutch means comprising a non-rotatable axially shiftable brake member, control mechanism for controlling said brake member comprising a shift lever with limited movement in opposite directions into two operative positions, an operating shaft connected to said lever, an arm secured to said shaft, an over center spring connected to said arm effective for completing throw thereof in either direction, means for turning said arm in one direction beyond dead center position of said spring, and power driven means responsive to the engagement of said clutch means for turning said arm in the other direction beyond dead center position of said spring, said arm having a socket element disposed substantially transversely of said shaft for reception of a handle for turning said arm manually in either direction.

CLARENCE M. EASON.